United States Patent
Choudhary et al.

(10) Patent No.: US 6,346,228 B1
(45) Date of Patent: Feb. 12, 2002

(54) HYDROPHOBIC MULTICOMPONENT CATALYST USEFUL FOR DIRECT OXIDATION OF HYDROGEN TO HYDROGEN PEROXIDE

(75) Inventors: Vasant Ramchandra Choudhary; Subhash Dwarkanath Sansare; Abaji Govind Gaikwad, all of Pune (IN)

(73) Assignee: Council of Scientific and Industrial Research (IN)

( * ) Notice: Subject to any disclaimer, the term of this patent is extended or adjusted under 35 U.S.C. 154(b) by 0 days.

(21) Appl. No.: 09/487,427

(22) Filed: Jan. 19, 2000

(30) Foreign Application Priority Data

Feb. 19, 1999 (IN) .......................... 273-DEL/99

(51) Int. Cl.[7] .......................... C01B 15/01; B01J 29/06; B01J 23/00
(52) U.S. Cl. .......................... 423/584; 502/4; 502/71; 502/77; 502/304; 502/307; 502/308; 502/310; 502/313; 502/314; 502/316; 502/318; 502/321; 502/322; 502/327; 502/329; 502/331; 502/332; 502/333; 502/334; 502/335; 502/336; 502/337; 502/338; 502/339; 502/349; 502/352; 502/355
(58) Field of Search .............................. 423/584; 502/4, 502/71, 77, 211, 213, 226, 227, 228, 230, 304, 307–308, 310, 313–314, 316, 318, 321–322, 327, 329, 331–334, 336, 338–339, 349, 352, 355

(56) References Cited

U.S. PATENT DOCUMENTS

| | | | | |
|---|---|---|---|---|
| 4,393,038 A | * | 7/1983 | Sun et al. | 423/584 |
| 4,832,938 A | * | 5/1989 | Gosser et al. | 423/584 |
| 5,169,618 A | * | 12/1992 | Maraschino | 423/584 |
| 5,399,334 A | * | 3/1995 | Kawakami et al. | 423/584 |
| 6,168,775 B1 | * | 1/2001 | Zhou et al. | 423/584 |

FOREIGN PATENT DOCUMENTS

| | | | | |
|---|---|---|---|---|
| EP | 0504741 A1 | * | 9/1992 | C01B/15/029 |
| EP | 0621235 A1 | * | 10/1994 | C01B/15/029 |
| WO | WO-93/14025 | * | 7/1993 | C01B/15/029 |

* cited by examiner

*Primary Examiner*—Steven P. Griffin
*Assistant Examiner*—Maribel Medina
(74) *Attorney, Agent, or Firm*—Ladas & Parry

(57) ABSTRACT

The present invention relates to a novel hydrophobic multicomponent catalyst useful in the direct oxidation of hydrogen to hydrogen peroxide and to a method for the preparation of such catalyst. More specifically, this invention relates to a novel hydrophobic muticomponent catalyst comprising a hydrophobic polymer membrane deposited on a Pd containing acidic catalyst, useful for the direct oxidation of hydrogen by oxygen to hydrogen peroxide, an a method for preparing the same.

29 Claims, No Drawings

HYDROPHOBIC MULTICOMPONENT CATALYST USEFUL FOR DIRECT OXIDATION OF HYDROGEN TO HYDROGEN PEROXIDE

FIELD OF THE INVENTION

The present invention relates to a novel hydrophobic multicomponent catalyst useful in the direct oxidation of hydrogen to hydrogen peroxide and to method for the preparation of such catalyst. More particularly, this invention relates to a novel hydrophobic multicomponent catalyst comprising a hydrophobic polymer membrane deposited on a Pd containing acidic catalyst, useful for the direct oxidation of hydrogen by oxygen to hydrogen peroxide, and a method for the preparation thereof. The present invention also envisages direct oxidation of hydrogen to hydrogen peroxide in the presence of the novel catalyst of the present invention.

The hydrophobic catalyst of the invention has a great potential utility in the chemical and petrochemical industries for the production of hydrogen peroxide by direct oxidation of hydrogen by oxygen to hydrogen peroxide in an environmentally clean manner.

BACKGROUND OF THE INVENTION

U.S. Pat. No. 1,108,752 of Henkel et al discloses the use of palladium for promoting the formation of hydrogen peroxide and water from a mixture of hydrogen and oxygen. Since then, there are numerous disclosures of palladium containing catalysts useful for the direct oxidation of hydrogen by oxygen to hydrogen peroxide.

Hydrophilic Catalysts for the Direct Oxidation of Hydrogen by Oxygen to Hydrogen Peroxide U.S. Pat. No. 4,832,938 of Grosser et al discloses a Pt—Pd bimetallic catalyst supported on a carbon, silica or alumina support for making hydrogen peroxide from direct combination of hydrogen and oxygen in an aqueous reaction medium. German Patent Ger. Offen. DE 4,127,918 of Lueckoff et al discloses a supported palladium gold catalyst for the manufacture of hydrogen peroxide from hydrogen and aqueous medium, the catalyst containing 5–95 weight % of Au and supported on carbon. A number of platinum group metal containing catalysts: (1) Pt-Group metal on high surface area support, such as carbon, silica or alumina (Ref. U.S. Pat. No. 5,169,618); (2) Pt-Group catalyst on solid acid carrier (Ref. EP application No. 504,741 A1); (3) Pt-Group element supported on Nb—or Ta oxide (Ref. WO 9,412,428 A1); (4) Sn-modified Pt-Group metals supported on catalyst carriers (ref. EP Application No. 621,235 A1); (5) Pt-Group metal catalyst supported on hydrophilic support (Ref. U.S. Pat. No. 5,399,334) for the oxidation of hydrogen to hydrogen peroxide are known in the prior art.

The above-mentioned Pd- of Pt-Group metal containing catalysts are hydrophilic in nature, and hence the aqueous reaction medium used in the oxidation of hydrogen to hydrogen peroxide over these catalysts is in close contact with the catalyst surface. When the above-mentioned catalysts are used, the selectivity for hydrogen peroxide is drastically reduced because of the close contact between the catalyst and the reaction medium. The hydrogen peroxide, which is formed by the reaction between hydrogen and oxygen on the catalyst and then absorbed in the reaction medium due to the high affinity between hydrogen peroxide and water, is readsorbed on the catalyst from the reaction medium and converted to water and oxygen. Fu et al also disclose that Pd catalysts supported on hydrophobic support are selective towards hydrogen peroxide formation in the oxidation of hydrogen [Ref. Fu et al., Stud. Surf. Sci. Catal., 72 (1992) 33–41].

Hydrophobic Catalysts for Direct Oxidation of $H_2$ by $O_2$ to Hydrogen Peroxide A few Pt-group or Group VIII metal catalysts deposited on hydrophobic support, useful for the oxidation of hydrogen to hydrogen peroxide are also known in the prior art.

Japanese Patent Jpn. Kokai Tokyo Koho JP 01133909 A2 of Kyora discloses a Pt-Group metal catalyst carried on a hydrophobic support such as porous and hydrophobic Teflon. EP 3,660,419 A1 of Chuang discloses a Group VIII metal catalyst deposited on a hydrophobic support for the manufacture of hydrogen peroxide by reacting hydrogen with oxygen in an aqueous medium. Intl. Appl. WO 9314025 A1 of Chuang discloses a Group VIII metal on a partially hydrophobic and partially hydrophilic support, such as Pd on fluorinated carbon, as a catalyst for the oxidation of hydrogen to hydrogen peroxide.

Although the hydrophobic support used in these catalysts provides some hydrophobic character to the Pd—or Group VIII metal catalysts, they also suffer from various disadvantages and limitations. It is difficult to deposit catalytically active components from aqueous solution on a hydrophobic support as there is no wetting of the surface of the hydrophobic support by the aqueous solution. Another disadvantage is that hydrophobic supports such as Teflon or other hydrophobic polymer supports are thermally unstable at the calcination temperatures that are normally employed for decomposing the precursor compounds of catalytically active components of the catalyst. Yet another disadvantage is that the hydrophobic character of the support is lost at least partially, if not completely due to the deposition of hydrophilic catalytically active components on the hydrophobic support.

Apart from the above mentioned disadvantages and/or limitations, the prior art catalysts with or without hydrophobic support are employed in the oxidation of hydrogen by oxygen to hydrogen peroxide at a pressure much above the atmospheric pressure. At high pressure, the explosion hazards for the reaction between hydrogen and oxygen are higher.

Thus, there is a need for developing a new catalyst that is active in the direct oxidation of hydrogen to hydrogen peroxide even at atmospheric pressure and also has a hydrophobic character such that the selectivity for the formation of hydrogen peroxide by the reaction of hydrogen and oxygen in an aqueous medium is high.

OBJECTS OF THE INVENTION

It is an object of the invention to provide a novel hydrophobic catalyst useful for the direct oxidation of hydrogen by oxygen to hydrogen peroxide with high selectivity.

It is another object of the invention to provide a novel hydrophobic catalyst useful for the direct oxidation of hydrogen by oxygen to hydrogen peroxide, which has high selectivity even at atmospheric pressure and in an aqueous medium.

It is another object of the present invention to provide a process for the preparation of such novel hydrophobic catalyst for the direct oxidation of hydrogen by oxygen to hydrogen peroxide with high selectivity even at atmospheric pressure and in an aqueous medium.

It is a further object of the invention to provide a novel hydrophobic catalyst comprising PdO in a highly acidic environment created by a solid acid or a solid super acid such that the catalyst shows both high activity and high selectivity in the direct oxidation of hydrogen to hydrogen peroxide.

It is yet another object of the invention to provide a novel hydrophobic multicomponent catalyst that is useful for the direct oxidation of hydrogen by oxygen even at atmospheric pressure and shows high hydrogen conversion activity and high selectivity for hydrogen peroxide formation.

These and other objects of the invention are accomplished by providing a novel hydrophobic multicomponent catalyst comprising a hydrophobic polymer membrane deposited on a highly acidic Pd containing catalyst, and a process for the preparation thereof.

SUMMARY OF THE INVENTION

Accordingly, the present invention relates to a novel hydrophobic multicomponent catalyst useful in the direct oxidation of hydrogen by oxygen to hydrogen peroxide, said catalyst being of the formula:

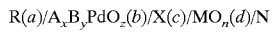

$R(a)/A_xB_yPdO_z(b)/X(c)/MO_n(d)/N$ wherein: R is a hydrophobic polymer, which forms a hydrophobic polymer membrane permeable to hydrogen, oxygen and hydrogen peroxide vapors; A is a metallic element selected from a group consisting of Ag, Au, Cu, Fe, Cd, Zn, Sn or mixtures thereof; B is a noble metal element other than palladium and selected from the group consisting of Ru, Pt, Rh, Ir, Os, or a mixture thereof; Pd is palladium element; O is oxygen element; X is a halogen element selected from the group consisting of F, Cl, Br, I or a mixture thereof; M is N an element selected from S, P, Mo, W, Ce, Sn, Th, or a mixture thereof; N is a catalytic porous solid, optionally supported on a conventional catalyst carrier; x is A/Pd mole ratio in the range of 1 to about 1; y is a B/Pd mole ratio in the range of 1 to about 0.5; z is the number of oxygen atoms needed to fulfill the valence requirement of $A_xB_yPd$; n is the number of oxygen atoms required to fulfill the valence requirement of M; d is a weight percent loading of M deposited as $MO_n$ on the catalytic porous solid N, in the range of about 0.2 wt % to about 20 wt %, c is the weight percent loading of halogen X deposited on $MO_n(d)/N$ in the range of about 0.2 wt % to about 20 wt %; b is the weight percent loading of $A_xB_yPd$ on $X(c)/MO_n(d)/N$ in the range of about 0.1 wt % to about 20 wt %; a is the weight percent loading of the hydrophobic polymer R deposited on $A_xB_yPdO_z(b)/X(c)/MO_n(d)/N$ in the range of about 0.01 wt % to about 10 wt %.

The present invention also provides a process for the preparation of said novel hydrophobic multicomponent catalyst, said process comprising the steps of:

i. depositing $MO_n$ on the surface of a catalytic porous solid N, optionally deposited on a conventional catalyst carrier, by impregnating or coating N with a compound of M, wherein M is an element selected from the group consisting of S, Mo, W, Ce, Sn, or a mixture thereof, which on decomposition or calcination converts to the oxide form in quantity sufficient to obtain a weight percent loading of M on N in the range of about 0.02 wt % to about 20 wt %, subsequently drying the resulting wet mass and then calcining the dried mass in air, inert gas or under vacuum at a temperature in the range of about 400° C. to about 800° C. for a period in the range of about 0.1 h to about 10 h;

ii. halogenating the mass obtained in step (i) by impregnating it with one or more halogen containing compounds represented by the formula ED, wherein D is an anion selected from the group consisting of $F^-$, $Cl^-$, $Br^-$, $I^-$ and $(HF_2)^-$, and E is a cation selected from the group consisting of $NH_4^+$ and $H^+$, in a quantity sufficient to obtain a loading of halogen X on the mass obtained from step (i) in the range of about 0.02 wt % to about 20 wt % and subsequently drying the resulting wet mass and then calcining the dried mass in air, inert gas or under vacuum at a temperature in the range of about 300° C. to about 600° C. for a period in the range of about 0.2 h to about 20 h;

iii. depositing $A_xB_yPdO_z$ on the surface of the halogenated mass, obtained in step (ii) by impregnating or coating it with compounds of A, B, and Pd wherein A is a metallic element selected from the group consisting of Ag, Au, Cu, Fe, Cd, Zn, Sn or mixtures thereof, B is a noble metal element selected from the group consisting of Ru, Pt, Rh, Ir, Os, or a mixture thereof, Pd is palladium element, which on decomposition or calcination converts to their oxide form, with A/Pd and B/Pd mole ratios being in the range of 0 to about 1 and 0 to 0.5 respectively, and in quantities sufficient to obtain a loading of $A_xB_yPd$ on the mass obtained in step (ii) in the range of about 0.1 wt % to about 20 wt % and subsequently drying the resulting wet mass and then calcining the dried mass at a temperature in the range of about 350° C. to about 650° C. in the presence of air or oxygen for a period in the range of about 0.2 h to about 20 h; and iv. finally depositing a hydrophobic polymer membrane, which is permeable to hydrogen and oxygen gases and hydrogen peroxide vapors on the surface of the catalytic mass obtained in step (iii) by impregnating a hydrophobic polymer, with or without crosslinking agent, from its solution in an organic solvent in quantities sufficient to obtain a loading of hydrophobic polymer on the catalytic mass in the range of about 0.01 wt % to about 10 wt % and subsequently removing the solvent from the polymer impregnated catalytic mass under vacuum at a temperature below 100° C. and then heating the solvent—free mass in air or oxygen at a temperature in the range of about 40° C. to about 250° C. for a period in the range of about 0.01 h to about 10 h.

The catalytic porous solid used in the catalyst preparation process of the invention is selected from the group consisting of γ- or η-alumina, silica, silica-alumina, amorphous zirconium hydroxide, zirconium oxide, thorium oxide, uranium oxide, rare earth oxide, titanium oxide, niobium oxide, tantalum oxide, yttrium oxide, gallium oxide, indium oxide, $H^+$ form pentasil zeolites containing 5-membered oxygen rings and having the structures ZSM-5, ZSM-11 or ZSM-8, H mordenite zeolite, ultra stable HY zeolite or dealuminated HY zeolite, silicalite-I (high silica ZSM-5), silicalite II (high silica ZSM-11), high alumina MCM-41 zeolite, high silica MCM-41 zeolite with or without grafting by Al, Ga or transition element, an activated carbon or a mixture of two or more thereof. All these catalytic porous solids are well known in the prior art. The catalytic porous solid is optionally supported on a conventional catalyst carrier, such as monolith catalyst carriers, low surface area ($1<m^2s^{-1}$), macroporous (pore size: above 20 nm), mesoporous (pore size: 1–20 nm) and catalyst carriers in a form of pellets or granules of different sizes and shapes and/or mesoporous (pore size: 1–20 nm) high silica zeolites such as high silica MCM-41, by depositing precursor compound of the catalytic porous solid on the catalyst support or carrier by impregnation, coating or precipitation technique followed by drying and calcination at 250° C. to 800° C. The impregnation, coating and precipitation techniques are well known in the art.

Examples of the compounds of S, Mo, W, Ce, Sn, and P elements are as follows: the compounds of S are sulphuric acid and ammonium sulphate; the compounds of P are phosphoric acid and ammonium phosphates; the compounds of Mo are ammonium molybdate and molybdenum oxide; the compounds of W are ammonium metatungstate, tungsten oxide and tungstic acid; the compounds of Ce are cerium (III) nitrate, cerium(III) acetate, cerium(III) hydroxide, ammonium cerium(IV) nitrate and cerium(IV) oxide; and the compounds of Sn are tin(II) nitrate, tin(II) acetate and tin(II) oxide.

Examples of the compounds of the metallic elements, Ag Au, Cu, Fe, Cd and Zn and noble metal elements Pd, Pt, Ru, Rh, Ir and Os are as follows: the compounds of the metallic elements are their nitrates, acetates, chlorides, hydroxides, and oxides; the compounds of the noble metal elements are their nitrates, acetates, chlorides, ammonium salts, such as ammonium hexa chloro-palladate(IV), or -platinate (IV) or -osmate (IV) or -rhodate(III) or -ruthenate(IV) or -iridate (IV), chloro acids (for example, chloroplatinic acid, $H_2PtCl_6$), and the like.

The hydrophobic polymer used in step (iv) of the process of the invention is selected from polyfluorocarbons, polysulfones, polysiloxanes or silicon rubbers, polysulphide rubbers, and the like.

The halogenation or halidation of the mass obtained from step (i) of the process can also be done by contacting the mass with gaseous hydrogen halide or with the vapors of halohydrocarbon(s) at 100° C.–500° C. for a period sufficient to achieve the required weight percent loading of halogens on the mass. However, the method based on the impregnation of halogen containing compounds, as discussed step (ii) of the process of the invention is preferable.

The role of the catalytic porous solid N is to provide a support and also a highly acidic environment for the noble and other metal oxides in the catalyst, after modification of its surface acidity in the first two steps of the process. The catalytic porous solid is optionally supported on a conventional support which acts to provide a mechanically strong and/or thermally stable matrix for the catalytic porous solid, to increase the dispersion and hence the surface area of the catalytic porous solid, and also to reduce the pressure drop across the catalyst bed, particularly for fixed bed operation of the catalyst. The role of $MO_n$ that is incorporated in the catalyst in step (i) of the process, is to increase both the number of surface acid sites and the acid strength of the catalytic porous solid used in the catalyst preparation. For example, catalytic porous solids such as alumina, zirconia, titania, silica and tin oxide on their modification by $SO_4$, $WO_3$ or $MoO_3$ are transformed into super acids.

The halogen elements X incorporated into the catalyst in step (ii) of the process greatly increase the surface acidity and/or change the nature of the surface acidity of the catalytic porous solid. For example, alumina, which contains only Lewis acid sites, on its modification by fluorine or chlorine containing compounds, is transformed into a protonic solid acid. Palladium oxide that is incorporated into the catalyst in step (iii) of the process provides catalytically active sites that are more selective in the acidic environment for the formation of hydrogen peroxide, for the direct oxidation of hydrogen by oxygen to hydrogen peroxide. The oxides of metallic elements A and noble metals other than Pd, designated as B, that are also incorporated into the catalyst along with palladium oxide in step (iii) of the process increase the hydrogen conversion activity of the catalyst in the direct oxidation of hydrogen by oxygen to hydrogen peroxide by acting synergistically. The hydrophobic polymer R incorporated into the catalyst in step (iv) of the process provides a hydrophobic character to the catalyst by forming a thin film or layer of hydrophobic polymer membrane on the catalyst that is permeable to oxygen, hydrogen and hydrogen peroxide vapors but not to liquid water. This avoids the direct contact between the active sites present on the catalyst and the aqueous medium thus drastically increasing the selectivity for hydrogen peroxide formation in the direct oxidation of hydrogen by oxygen to hydrogen peroxide in an aqueous medium.

In view of the above-mentioned roles of the various components of the catalyst, all the components and the steps of incorporation thereof into the catalyst are critical for achieving high hydrogen conversion with high hydrogen peroxide selectivity in the direct oxidation of hydrogen by oxygen to hydrogen peroxide in an aqueous medium.

In the catalyst of the invention and its preparation process, the preferred catalytic porous solid N, is an acidic porous solid selected from a group consisting of γ- or η-alumina, silica-alumina, gallium oxide, cerium oxide, amorphous zirconia or zirconium hydroxide, thorium oxide, H-ZSM5 zeolite, H-ZSM11 zeolite, H-ZSM8 zeoite, H-mordenite zeolite, H-MCM41 zeolite, or a mixture thereof. Preferably M is selected from a group consisting of S, P, Ce, or a mixture thereof, the preferred loading of M, d is in the range of above 0.5 wt % to about 10 wt %. X is preferably F, Cl or a mixture thereof. D, the anion, is selected from a group consisting of $F^-$, $Cl^-$ and $(HF_2)^-$; the loading c, of said halogen, being preferably in the range of about 0.5 wt % to about 10 wt %.

The metallic element A is preferably selected from a group consisting of Au, Sn, or a mixture thereof, with the noble metal other than palladium B is preferably selected from the group consisting of Ru, Pt, or a mixture thereof. The mole ratios A/Pd, x, and the B/Pd, y, are both preferably in the range of about 0.001 to about 0.1. The loading percent of the metallic elements ($A_xB_y$Pd) b is preferably in the range of 0.5 wt % to about 7.5 wt %. The hydrophobic polymer R is preferably selected from the group consisting of polyfluorocarbons, polysiloxanes or silicone rubbers, polysulfones or a mixture thereof and the loading a, of the hydrophobic polymer is preferably in the range of about 0.05 wt % to about 5 wt %.

A number of polyfluorocarbons, polysulfones and polysiloxanes (commonly known as silicone rubbers), that are hydrophobic polymers and therefore not wetted by water or aqueous solution are known in the art. Examples of polyfluorocarbons are polyvinylidine fluoride, polyvinylidine fluoride-hexafluoropropylene copolymer, polytetrafluoroethylene, polychloretrifluoroethylene and polyethylene-tetrafluoroethylene copolymer. Examples of polysulfones are polysulfone, polyethersulfone, polyphenylsulfone and other hydrophobic polymers containing sulfur dioxide groups. Examples of polysiloxanes are polydimethylsiloxane, polymethylphenylsiloxane, polytrifluoropropylmethylsiloxane, and copolymers of dimethylsiloxane with methylphenylsiloxane, phenylvinylsiloxane or methylvinylsiloxane. Other examples of hydrophobic polymer are polysulphide rubbers. Among the above hydrophobic polymers, the most preferred are selected from the group consisting of polyvinylidine fluoride, polyethersulfone, and polydimethylsiloxane containing less than 1% vinyl groups.

In step (iv) of the process, the organic solvent for the hydrophobic polymer is selected from $C_6$ to $C_8$ alkanes, benzene, toluene, xylenes, dimethyl acetamide, dimethyl formamide and dimethylsulfoxide and the crosslinking agent when used, may be trimethylol propane or benzoyl peroxide or a commercial product for example SLE 5300B obtained from GE Silicones (India) Pvt. Ltd.

In an embodiment of this invention, the catalytic porous solid N is an acidic porous solid selected from the group consisting of γ- or η-alumina, silica alumina, gallium oxide, cerium oxide, amorphous zirconia or zirconium hydroxide, thorium oxide, H-ZSM-5 zeolite, H-ZSM-11 zeolite, H-ZSM-8 zeolite, H-mordenite zeolite, H-MCM-41-zeolite, or any mixture thereof.

In an embodiment, M is selected from the group of elements selected from S, Ce, P or any mixture thereof.

In yet another embodiment (d) is in the range of from 0.5 wt % to 10 wt %.

In a further embodiment, the halaogen element X is F, Cl or a mixture thereof.

In a preferred embodiment, the anion D is selected from the group consisting of $F^-$, $Cl^-$ and $(HF^2)^-$.

In another embodiment, (c) is in the range of about 0.5 wt % to 10 wt %

In a preferred embodiment, said transition element A is selected from the group consisting of Au, Sn or a mixture thereof said noble metal element other than Pd, B is selected from Ru, Pt or a mixture thereof.

In a yet another embodiment, said A/Pd mole ratio, x is in the range of from 0.001 to 0.1.

In another preferred embodiment, said B/Pd mole ratio, y is in the range of about 0.001 to 0.1.

In another embodiment, said (b) is in the range of about 0.5 wt % to about 7.5 wt %.

The catalyst prepared by the process of this invention can be used in any catalytic process for the production of hydrogen peroxide by the reaction between hydrogen and oxygen in a liquid reaction medium comprising water, with a high conversion of hydrogen and high selectivity for hydrogen peroxide formation, even at atmospheric pressure and room temperature.

It is observed that because of the deposition of the hydrophobic polymer membrane on the catalyst, the selectivity for the hydrogen peroxide in the direct oxidation of hydrogen by oxygen to hydrogen peroxide in an aqueous medium is increased. It is also observed that both the hydrogen conversion activity and the selectivity for hydrogen peroxide formation in the direct oxidation of hydrogen by oxygen to hydrogen peroxide, of the catalyst of the invention is high due to the highly acidic nature of the catalyst. Another important finding of the invention is that the catalyst of the invention can be used for the direct oxidation of hydrogen by oxygen to hydrogen peroxide even at atmospheric pressure and room temperature with high selectivity for hydrogen peroxide formation and high hydrogen conversion.

The present invention is described with reference to the following examples which are however only illustrative and should not be construed as limiting the scope of the invention in any manner.

In the following examples,

Conversion of $H_2$(%)=mole % of the hydrogen converted to all products

Selectivity for $H_2O_2$(%)=[{conversion of $H_2$ to $H_2O_2$(%)}/{conversion of $H_2$ to all products (%)}]/*100

Yield of $H_2O_2$(%)=mole % of $H_2$ converted to $H_2O_2$=[{conversion of $H_2$(%)* {selectivity for $H_2O_2$(%)}]/100

The flow rates of gases are measured at 0° C. and 1 atm. pressure. Gas hourly space velocity (GHSV) is a volume of gas, measured at 0° C. and 1 atm pressure, passed or bubbled through unit volume of liquid reaction medium containing catalyst per hour.

Catalyst loading is defined as an amount of catalyst in gram present per $dm^3$ of the liquid reaction medium and has a unit of $g.dm^3$.

All the percent concentrations of solutes in their solutions are expressed as mass of solute in grams per 100 ml solution.

EXAMPLE 1

This example illustrates the process of this invention for the preparation of a novel hydrophobic multicomponent catalyst useful for the direct oxidation of hydrogen to hydrogen peroxide.

The catalyst was prepared in the following four sequential steps.

Step 1.: 100 g of finely powdered γ alumina (prepared by hydrolysing aluminium isopropoxide by water at room temperature, washing the hydrolysed mass and then drying and calcining it at 500° C. for 4 h) was impregnated with a mixture of 1.6 g of $H_2SO_4$ (98%) and 3.1 g Ce $(NO_3)_3$. 6 $H_2O$ from their aqueous solution by the incipient wetness impregnation technique and the impregnated mass was dried in an air oven at 120° C. for 10 hours and then calcined in air at 600° C. for 2 hours.

Step 2: the calcined mass obtained from step 1 was impregnated with a mixture of 10 g of $NH_4F$ and 1.6 g $NH_4Cl$ by the incipient wetness impregnation technique and the impregnated mss was dried under vacuum at 80° C. and then calcined in air at 500° C. for 4 hours.

Step 3: The calcined mass obtained from step 2 was impregnated with a mixture of 0.04 g $AuCl_3$, 0.05 g of $RuCl_3$ and 4.5 g of $PdCl_2$ from their aqueous HCl solution by the wet impregnation technique and the impregnated mass was dried in an air oven at 100° C. for 4 hours and then calcined in air at 500° C. for 4 hours.

Step 4: finally, the calcined catalyst mass obtained from step 3 was impregnated with 2.3 g polyvinylidine fluoride from its solution in dimethyl formamide solvent by the incipient wetness technique and the impregnated mass was heated first under vacuum at 90° C. for 4 hours and then in air at 120° C. for 1 hour, to provide a catalyst having a composition: polyvinylidine fluoride (2.0 wt %)/$Au_{0.005}Ru_{0.01}PdO_z$ (2.5 wt % Au, Ru & Pd)/F & Cl (6.0 wt %)/S Ce $O_n$ (1.5 wt % S and Ce)/γ-alumina.

In the incipient wetness technique of impregnation, the volume of impregnation solution is just sufficient to completely wet the solid to be impregnated and there is no free solution in the impregnation mixture.

In the wet impregnation technique, more volume of impregnation solution that that for completely wetting the solid to be impregnated is used and the excess of the solution present in the impregnation mixture is evaporated while stirring at about 100° C. until there is no free solution left in the impregnation mixture.

EXAMPLE 2

This example illustrates the use of the hydrophobic multicomponent catalyst prepared by the process of Example 1 in the direct oxidation of hydrogen by oxygen to hydrogen peroxide in aqueous reaction media at room temperature and at atmospheric pressure.

The direct oxidation of hydrogen to hydrogen peroxide reaction over the catalyst was carried out in a magnetic stirred glass reactor (capacity 300 $cm^3$), containing 0.5 g catalyst and 200 ml aqueous 0.016 M sulphuric acid solution as the reaction medium, by bubbling hydrogen and oxygen at a flow rate of 15 and 385 $cm^3$/h, respectively, through the liquid reaction medium under vigorous stirring at room temperature (28±2° C.) and atmospheric pressure (0.95 atm) for a period of 3 hours. The reactor was kept in a constant temperature water bath maintained at room temperature. The temperature of the reaction medium was measured by a glass thermometer. The flow rates of hydrogen and oxygen were controlled by different flow controllers. The flow rates of reactor effluent gases were measured by using a soap bubble flow meter. The concentration of hydrogen in the effluent gases, after removing water vapor from them by condensation at 0° C., was measured by an on line gas chromatograph with a thermal conductivity detector using argon as a carrier gas and 5A molecular sieve column. After stopping the reaction, the catalyst from the reaction medium was removed by filtration and the filtered reaction medium was analysed for the hydrogen peroxide formed by the well known iodometric titration method (Ref. A. I. Vogel, A textbook of quantitative inorganic analysis, $3^{rd}$ Ed. London, Longman, 1972).

The conversion of hydrogen and selectivity and yield for hydrogen peroxide in the reaction were estimated as given below:

Conversion of $H_2$(%)=[(moles of $H_2$ fed to the reactor)−moles of $H_2$ present in the reactor effluent gases)/(moles of $H_2$ fed to the reactor)]×100

Selectivity for $H_2O_2$(%)={(moles of $H_2O_2$ formed in the reaction)/ [(moles of $H_2$ fed to the reactor)−moles of $H_2$ present in the reactor effluent gases)]}×100

Yield of $H_2O_2$(%)=[(moles of $H_2O_2$ formed in the reaction)/ (moles of $H_2$ fed to the reactor)]×100

The results obtained are given below:
Conversion of $H_2$=55.2%
Selectivity for $H_2O_2$=43.3%
Yield of $H_2O_2$=23.9%

EXAMPLE 3

A novel hydrophobic multicomponent catalyst of this invention was prepared by the four sequential steps out of which the first three steps (steps 1–3) were exactly the same as described in Example 1 and the fourth step was as follows:
Step 4.: the calcined mass obtained from step 3 was impregnated with a mixture of 3.5 gm silicone rubber (polydimethyl siloxane with less than 1% vinyl groups) and 0.35 gm trimethyloyl propane, which is a cross linking agent, from their solution in toluene by the incipient wetness technique and the impregnated mass was heated under vacuum at 60° C. for 4 hours after removing the solvent (toluene) and then in air at 80° C. for 2 hours for curing the silicone rubber to provide the catalyst same as that described in Example 1 except that the hydrophobic polymer was polydimethylsiloxane with a loading of 3.5 wt. %.

EXAMPLE 4

A novel hydrophobic multicomponent catalyst of the invention was prepared by the four sequential steps as described in Example 1, except that in step 4, a polyether sulfone was used instead of a polyvinylidine fluoride as a hydrophobic polymer with a loading of 2.0 wt.

EXAMPLE 5

A novel hydrophobic multicomponent catalyst of the invention was prepared by the four sequential steps as described in Example 3, except that in step 4, the amount of silicone rubber used was 0.06 gm instead of 3.5 gm and the amount of trimethyl propane used was 0.006 gm instead of 0.05 gm.

EXAMPLE 6

A novel hydrophobic multicomponent catalyst of the invention was prepared by the four sequential steps as described in Example 3, except that in step 2, a mixture of 1.1 gm of $NH_4F$ and 8.0 gm of $NH_4Cl$ was used instead of 10 gm of $NH_4F$ and 1.6 gm $NH_4Cl$.

EXAMPLE 7

This example illustrates the process of this invention for the preparation of a novel hydrophobic multicomponent catalyst useful for the direct oxidation of hydrogen to hydrogen peroxide. The catalyst was prepared in the following four sequential steps.
Step 1.: 100 g of H-ZSM5 zeolite with Is/Al mole ratio of 31.1, prepared by the method described earlier (Ref. Nayak & Choudhary, Appl. Catal. Vol. 4, page 333, year 1982) was impregnated with 7.5 gm of $H_3PO_4$ (85%) from its aqueous solution by the incipient wetness impregnation technique and the impregnated mass was dried in an air oven at 120° C. for 10 hours and then calcined in air at 500° C. for 6 hours.
Step 2: The calcined mass obtained from step 1 was impregnated with a mixture of 5 g of $NH_4F$ and 3.2 g $NH_4Cl$ by the incipient wetness impregnation technique and the impregnated mss was dried under vacuum at 80° C. for 6 hours and then calcined in air at 500° C. for 4 hours.
Step 3: The calcined mass obtained from step 2 was impregnated with a mixture of 0.016 g $AuCl_3$, 0.042 g of $PtCl_4$ and 4.5 g of $PdCl_2$ from their aqueous HCl solution by the wet impregnation technique and the impregnated mass was dried in an air oven at 100° C. for 4 hours and then calcined in air at 500° C. for 4 hours.
Step 4: Finally, the calcined catalyst mass obtained from step 3 was impregnated with 0.06 gm of polydimethylsiloxane and 0.006 gm trimethyloyl propane from their solution in toluene by the incipient wetness technique and the impregnated mass was heated first under vacuum at 90° C. for 4 hours and then in air at 90° C. for 6 hour, to provide a catalyst having a composition: polydimethylsiloxane (0.06 wt %)/$Au_{0.002}Pt_{0.005}PdO_z$ (2.5 wt % Au, Pt & Pd)/F & Cl (4.5 wt %)/$PO_n$ (2.3 wt % P)/H-ZSM5.

EXAMPLE 8

A novel hydrophobic multicomponent catalyst of this invention was prepared by the four sequential steps as described in Example 7 except that in step 3, the amount of $PdCl_2$ used is 13.5 gm instead of 4.5 gm.

EXAMPLE 9

A novel hydrophobic multicomponent catalyst of this invention was prepared by the four sequential steps as described in Example 7 except that in step 3, the amount of $PdCl_2$ used is 0.9 gm instead of 4.5 gm.

EXAMPLE 10

A novel multicomponent hydrophobic catalyst of this invention was prepared in the following four consecutive steps.
Step 1.: 10 g of finely powdered H-mordenite (Z900H obtained from M/s Norton Co. USA) was impregnated with a mixture of 0.16 gm of $Ce(No_3)_3.6H_2O$ from its aqueous solution by the incipient wetness impregnation technique and the impregnated mass was dried in an air oven at 120° C. for 10 hours and then calcined in air at 600° C. for 1 hour.

Step 2: The calcined mass obtained from step 1 was impregnated with 1 g of $NH_4F$ by the incipient wetness technique and the impregnated mss was dried under vacuum at 80° C. for 6 hours and then calcined in a flow of $N_2$ (30 ml/min) at 600° C. for 4 hours.

Step 3: The calcined mass obtained from step 2 was impregnated with a mixture of 0.006 g $SnCl_2.2H_2O$, 0.009 gm of $PtCl_4$ and 0.6 g of $Pd(NO_3)_z$ from their aqueous acidic solution by the wet impregnation technique and the impregnated mass was dried in an air oven at 100° C. for 4 hours and then calcined in air at 600° C. for 0.5 hours.

Step 4: Finally, the calcined catalyst mass obtained from step 3 was impregnated with 0.25 gm of polyvinylidine fluoride from its solution in dimethyl formamide solvent by the incipient wetness technique and the impregnated mass was heated first under vacuum at 90° C. for 4 hours and then in air at 150° C. for 0.5 hour, to provide a catalyst having a composition: polyvinylidine fluoride (2.3 wt %)/$Sn_{0.01}Pt_{0.01}PdO_z$ (2.8 wt % Sn, Pt & Pd)/F (5 wt %)/$CeO_n$ (0.5 wt % Ce)/H-mordenite.

EXAMPLE 11

A novel multicomponent hydrophobic catalyst of this invention was prepared in the following four consecutive steps.

Step 1: 10 g of finely powdered zirconium hydroxide (obtained by precipitating Zr(OH)4 from aqueous zirconyl nitrate solution by ammonium hydroxide, filtering and washing the precipitate and drying it at 200° C. for 4 hours) was impregnated with 0.62 gm of $H_2SO_4$ (98%) from its aqueous solution by the incipient wetness impregnation technique and the impregnated mass was dried in an air oven at 100° C. for 10 hours and then calcined in air at 650° C. for 4 hour.

Step 2: The calcined mass obtained from step 1 was impregnated with 0.2 gm of $NH_4F$ by the incipient wetness technique and the impregnated mss was dried under vacuum at 120° C. for 3 hours and then calcined in air at 500° C. for 10 hours.

Step 3: The calcined mass obtained from step 2 was impregnated with a mixture of 0.002 g $PtCl_4$ and 0.75 g of $PdCl_3$ from their aqueous acidic solution by the wet impregnation technique and the impregnated mass was dried in an air oven at 120° C. for 4 hours and then calcined in air at 600° C. for 0.5 hours.

Step 4: Finally, the calcined catalyst mass obtained from step 3 was impregnated with 0.1 gm of polyether sulfone from its solution in dimethyl formamide solvent by the incipient wetness technique and the impregnated mass was heated first under vacuum at 60° C. for 10 hours and then in air at 100° C. for 1 hour, to provide a catalyst having a composition: polyether sulfone (0.09 wt %)/$Pt_{0.005}PdO_z$ (4.1 wt % Pt & Pd)/F (1.0 wt %)/$SO_n$ (2 wt % S)/$ZrO_2$.

EXAMPLE 12

This example illustrates the use of the novel hydrophobic multicomponent catalyst of the invention, as prepared in Examples 3–11, for the direct oxidation of hydrogen by oxygen to hydrogen peroxide. The performance of the catalysts, prepared in Examples 3–11, in the catalytic process was evaluated by the procedures and at the reaction conditions as described in Example 2. The results obtained for the catalysts are presented in Table I.

TABLE I

Results of the catalysts prepared in Examples 3–11 for the direct oxidation of hydrogen by oxygen to hydrogen peroxide

| Catalyst | Conversion of $H_2$ % | Selectivity for $H_2O_2$ % | Yield of $H_2O_2$ |
|---|---|---|---|
| Prepared in Example 3 | 49.1 | 39.5 | 19.4 |
| Prepared in Example 4 | 47.9 | 45.1 | 21.6 |
| Prepared in Example 5 | 50.0 | 34.5 | 17.3 |
| Prepared in Bxample 6 | 56.7 | 39.7 | 22.5 |
| Prepared in Example 7 | 26.5 | 61.3 | 16.2 |
| Prepared in Example 8 | 28.3 | 39.9 | 11.3 |
| Prepared in Example 9 | 36.4 | 33.5 | 12.2 |
| Prepared in Example 10 | 30.7 | 34.1 | 10.5 |
| Prepared in Example 11 | 48.6 | 46.1 | 22.4 |

EXAMPLE 13

A novel hydrophobic multicomponent catalyst of the invention was prepared by the four sequential steps of Example 11 except that, zirconium hydroxide (25 wt %) supported on a high silica MCM 41 zeolite was used instead of an unsupported zirconium hydroxide in step 1. The high silica MCM-41 zeolite was prepared by the procedure described earlier (Ref. V. R. Choudhary and S. D. Sansare, Proc. Indian. Acad. Sci. (Chem. Sci.) 109, (1997), 229). The supported zirconium hydroxide was prepared by impregnating 3.7 g zirconyl nitrate on 7.5 g of MCM-41 by drying the impregnated mass at 120° C. for 4 hours, then impregnating the dried mass with concentrated aqueous solution of urea by the wet impregnation technique, heating the impregnated mass in a closed vessel at 80° C. for 2 hours, filtering and washing it with deionised water, drying the mss on water bath and finally calcining it in air at 200° C. for 4 hours to give the zirconium hydroxide supported on high silica MCM-41.

EXAMPLE 14

This example illustrates that the catalyst of this invention as prepared in Examples 1, 3 and 4 shows higher selectivity and yield for hydrogen peroxide in the direct oxidation of hydrogen by oxygen to hydrogen peroxide than when the catalyst does not contain any hydrophobic polymer membrane. The catalytic reaction direct oxidation of hydrogen by oxygen to hydrogen peroxide was carried out by the procedures ans the reactions conditions as described in Example 2. The results are given in Table 2.

TABLE 2

Comparison of the catalyst prepared in Examples 1, 3 and 4 with the same catalyst without any hydrophobic polymer membrane for the selectivity and yield for hydrogen peroxide in the direct oxidation of hydrogen by oxygen to hydrogen peroxide

| Catalyst | $H_2$ conversion (%) | Selectivity for $H_2O_2$ (%) | Yield of $H_2O_2$ (%) |
|---|---|---|---|
| Prepared in Example 1 | 55.2 | 43.3 | 23.9 |
| Prepared in Example 3 | 49.1 | 39.5 | 19.4 |
| Prepared in Example 4 | 47.9 | 45.1 | 21.6 |
| Same as Ex. 1, 3, & 4 but without hydrophobic polymer membrane | 39.3 | 17.9 | 8.8 |

The Novel Features and Advantages of the Catalyst of the Present Invention Over the Prior Art Catalysts 1. The main novel feature or advantage of the catalyst of the present invention is that a hydrophobic polymer membrane, which is permeable to gases or vapors but not for liquid or water or aqueous solutions, is deposited on the surface of the catalyst particles. Because of the hydrophobic polymer membrane, the aqueous reaction medium is not directly in contact with the active sites present on either the external or the internal surface of the catalyst. The hydrogen peroxide formed by the reaction between hydrogen and oxygen over the active sites of the catalyst is diffused through the membrane and then it is absorbed in the aqueous reaction medium. Since hydrogen peroxide has a high affinity for water and the aqueous medium containing hydrogen peroxide is not in direct contact with active sites of the catalyst, the catalytic decomposition of hydrogen peroxide to water and oxygen is avoided or drastically reduced. Because of this the selectivity of hydrogen peroxide formation over the formation of water from the catalytic reaction between hydrogen and oxygen is much higher than that obtained using the prior art catalysts.

2. Because of the presence of halogen, such as fluorine with or without other halogens in the catalyst of the present invention, the surface of the catalyst also becomes at least partially hydrophobic, which is useful for achieving higher selectivity in the formation of hydrogen peroxide from the catalytic reaction between hydrogen and oxygen. Also, because of the presence of halogen, the acidity of the catalyst is increased, making the catalyst highly acidic and thereby increasing both the activity and selectivity of the catalyst in the oxidation of hydrogen to hydrogen peroxide.

3. Unlike the prior art catalysts, the palladium element in the catalyst of this invention is present as palladium oxide, which is much more active for the oxidation of hydrogen to hydrogen peroxide than palladium in its zero oxidation state or palladium in its metallic form.

4. The catalyst of the present invention catalyses the reaction between hydrogen and oxygen producing hydrogen peroxide with a high conversion of hydrogen and a high selectivity or high yield for hydrogen peroxide, even at a pressure as low as atmospheric pressure and since the reaction using the catalyst of the present invention can be carried out at low pressures, explosion hazards are avoided.

What is claimed is:

1. A hydrophobic multicomponent catalyst useful in the direct oxidation of hydrogen by oxygen to form hydrogen peroxide comprising a hydrophobic polymer membrane deposited on a Pd containing acidic catalyst of the formula:

$$R(a)/A_xB_yPdO_z(b)/X(c)/MO_n(d)/N$$

wherein:

R is a hydrophobic polymer, which forms a membrane permeable to hydrogen, oxygen and hydrogen peroxide vapors; A is a metallic element selected from the group consisting of Ag, Au, Cu, Fe, Cd, Zn, Sn and mixtures thereof; B is selected from the group consisting of Ru, Pt, Rh, Ir, Os, and mixtures thereof; Pd is palladium; O is oxygen; X is selected from the group consisting of F, Cl, Br, I and mixtures thereof, M is selected from the group consisting of S, P, Mo, W, Ce, Sn, Tb, and mixtures thereof; N is a catalytic porous solid, optionally supported on a catalyst carrier; x is A/Pd mole ratio in the range of 0 to about 1; y is a B/Pd mole ratio in the range of 0 to about 0.5; z is the number of oxygen atoms needed to fulfill the valence requirement of M; (d) is a weight percent loading of M deposited as $MO_n$ on the catalytic porous solid N, in the range of about 0.02 wt % to about 20 wt %; (c) is the weight percent loading of X deposited on $MO_n(d)/N$ in the range of about 0.02 wt % to about 20 wt %; (b) is the weight percent loading of $A_xB_yPd$ deposited as $A_xB_yPdO_z$ on $X(c)/MO_n(d)/N$ in the range of about 0.1 wt % to about 20 wt %; and (a) is a weight percent loading of the hydrophobic polymer R deposited on $A_xB_yO_z(b)/X(c)/MO_n(d)/N$ in the range of about 0.01 wt % to about 10 wt %.

2. A catalyst as claimed in claim 1, wherein said catalytic porous solid N is an acidic porous solid selected from the group consisting of γ- or η-alumina, silica alumina, gallium oxide, cerium oxide, amorphous zirconia, zirconium hydroxide, thorium oxide, H-ZSM-5 zeolite, H-ZSM-11 zeolite, H-ZSM-8 zeolite, H-mordenite zeolite, H-MCM-41-zeolite, or mixtures thereof.

3. A catalyst as claimed in claim 1, wherein M is selected from the group consisting of S, Ce, P and mixtures thereof.

4. A catalyst as claimed in claim 1, wherein (d) is in the range of from 0.5 wt % to 10 wt %.

5. A catalyst as claimed in claim 1, wherein X is selected from the group consisting of F, Cl and mixtures thereof.

6. A catalyst as claimed in claim 1, wherein (c) is in the range of about 0.5 wt % to 10 wt %.

7. A catalyst as claimed in claim 1, wherein A is selected from the group consisting of Au, Sn and mixtures thereof.

8. A catalyst as claimed in claim 1, wherein B is selected from the group consisting of Ru, Pt and mixtures thereof.

9. A catalyst as claimed in claim 1, wherein said A/Pd mole ratio, x is in the range of from 0.001 to 0.1.

10. A catalyst as claimed in claim 1, wherein said B/Pd mole ratio, y is in the range of about 0.001 to 0.1.

11. A catalyst as claimed in claim 1, wherein (b) is in the range of about 0.5 wt % to about 7.5 wt %.

12. A catalyst as claimed in claim 1, wherein R is selected from the group consisting of polyflurocarbons, polysiloxanes, silicon rubbers, polysulfones and mixtures thereof.

13. A catalyst as claimed in claim 1, wherein (a) is in the range of about 0.05 wt % to 5 wt %.

14. A process for the preparation of a hydrophobic multicomponent catalyst for use in the direct oxidation of hydrogen to form hydrogen peroxide, said catalyst of the formula:

$$R(a)/A_xB_yPdO_z(b)/X(c)/MO_n(d)/N$$

wherein:

R is a hydrophobic polymer, which forms a membrane permeable to hydrogen, oxygen and hydrogen peroxide vapors; A is selected from the group consisting of Ag, Au, Cu, Fe, Cd, Zn, Sn and mixtures thereof; B is selected from the group consisting of Ru, Pt, Rh, Ir, Os, and mixtures thereof; Pd is palladium; O is oxygen; X is selected from the group consisting of F, Cl, Br, I and mixtures thereof; M is selected from the group consisting of S, P, Mo, W, Ce, Sn, Th, and mixtures thereof; N is a catalytic porous solid, optionally supported on a catalyst carrier; x is A/Pd mole ratio in the range of 0 to about 1; y is a B/Pd mole ratio in the range of 0 to about 0.5; z is the number of oxygen atoms needed to fulfill the valence requirement of M; (d) is a weight percent loading of M deposited as $MO_n$ on the catalytic porous solid N, in the range of about 0.02 wt % to about 20 wt %; (c) is the weight percent loading of halogen X deposited on $MO_n(d)/N$ in the range of about 0.02 wt % to about 20 wt %; (b) is the weight percent loading of $A_xB_yPd$ deposited as $A_xB_yPdO_z$ on $X(C)/MO_n(d)/N$ in the range of about 0.1 wt % to about 20 wt %; and (a) is a weight percent loading of the hydrophobic polymer R deposited on $A_xB_yPdO_2(b)/X(c)/MO_z(d)/N$ in the range of about 0.01 wt % to about 10 wt %, wherein said process comprises the steps of:

(i) depositing $MO_n$ on the surface of N, optionally deposited on a catalyst carrier, by impregnating or coating N with a compound of M, wherein M is selected from the group consisting of S, Mo, W, Ce, Sn, and mixtures thereof, which on decomposition or calcination converts to the oxide form in a quantity sufficient to obtain a weight percent loading of M on N in the range of about 0.02 wt % to about 20 wt %, subsequently drying the resulting wet mass and then calcining the dried mass in air, inert gas or under vacuum at a temperature in the range of about 400° C. to about 800° C. for a period in the range of about 0.1 h to about 10 h;

(ii) halogenating the mass obtained in step (i) by impregnating it with one or more halogen containing compounds represented by the formula ED, wherein D is an anion selected from the group consisting of $F^-$, $Cl^-$, $Br^-$, $I^-$ and $(HF_2)^-$, and E is a cation selected from the group consisting of $NH_4+$ and $H^+$ and mixtures thereof; in a quantity sufficient to obtain a loading of halogen X on the mass obtained from step (i) in the range of about 0.02 wt % to about 20 wt % and subsequently drying the resulting wet mass and then calcining the dried mass in air, inert gas or under vacuum at a temperature in the range of about 300° C. to about 600° C. for a period in the range of about 0.2 h to about 20 h;

(iii) depositing $A_xB_yPdO_z$ on the surface of the halogenated mass, obtained in step (ii) by impregnating or coating it with compounds of A, B, and Pd wherein A is selected from the group consisting of Ag, Au, Cu, Fe, Cd, Zn, Sn and mixtures thereof, B is selected from the group consisting of Ru, Pt, Rh, Ir, Os, and mixtures thereof, Pd is palladium, which on decomposition or calcination converts to their oxide form, with A/Pd and B/Pd mole ratios being in the range of 0 to about 1 and 0 to 0.5 respectively, and in quantities sufficient to obtain a loading of $A_xB_yPd$ on the mass obtained in step (ii) in the range of about 0.1 wt % to about 20 wt % and subsequently drying the resulting wet mass and then calcining the dried mass at a temperature in the range of about 350° C. to about 650° C. in the presence of air or oxygen for a period in the range of about 0.2 h to about 20 h; and (iv) depositing a hydrophobic polymer membrane, which is permeable to hydrogen and oxygen gases and hydrogen peroxide vapors on the surface of the catalytic mass obtained in step (iii) by impregnating a hydrophobic polymer, with or without crosslinking agent, from its solution in an organic solvent in quantities sufficient to obtain a loading of hydrophobic polymer on the catalytic mass in the range of about 0.01 wt % to about 10 wt % and subsequently removing the solvent from the polymer impregnated catalytic mass under vacuum at a temperature below 100° C. and then heating the solvent free mass in air or oxygen at a temperature in the range of about 40° C. to about 250° C. for a period in the range of about 0.01 h to about 10 h.

15. A process as claimed in claim 14, wherein N is an acidic porous solid selected from the group consisting of γ- or η-alumina, silica alumina, gallium oxide, cerium oxide, amorphous zirconia, zirconium hydroxide, thorium oxide, H-ZSM-5 zeolite, H-ZSM-11 zeolite, H-ZSM-8 zeolite, H-mordenite zeolite, H-MCM-41-zeolite, and mixtures thereof.

16. A process as claimed in claim 14, wherein M is selected from the group consisting of S, Ce, P and mixtures thereof.

17. A process as claimed in claim 14, wherein (d) is in the range of from 0.5 wt % to 10 wt %.

18. A process as claimed in claim 14, wherein X is selected from the group consisting of F, Cl and mixtures thereof.

19. A process as claimed in claim 14, wherein D is selected from the group consisting of $F^-$, $Cl^-$, $(HF^2)Y^-$ and mixtures thereof.

20. A process as claimed in claim 14, wherein (c) is in the range of about 0.5 wt % to 10 wt %.

21. A process as claimed in claim 14, wherein A is selected from the group consisting of Au, Sn and mixtures thereof.

22. A process as claimed in claim 14, wherein B is selected from the group consisting of Ru, Pt and mixtures thereof.

23. A process as claimed in claim 14, wherein x is in the range of from 0.001 to 0.1.

24. A process as claimed in claim 14, wherein y is in the range of about 0.001 to 0.1.

25. A process as claimed in claim 14, wherein (b) is in the range of about 0.5 wt % to about 7.5 wt %.

26. A process as claimed in claim 14, wherein R is selected from the group consisting of polyflurocarbons, polysiloxanes, silicon rubbers, polysulfones and mixtures thereof.

27. A process as claimed in claim 14, wherein (a) is in the range of about 0.05 wt % to 5 wt %.

28. A process as claimed in claim 14 wherein in step (iv) of the process, the organic solvent for the hydrophobic polymer is selected from the group consisting of $C_6$ to $C_8$ alkanes, benzene, toluene, xylenes, dimethyl acetamide, dimethyl formamide and dimethylsulfoxide and the crosslinking agent when used, is trimethylol propane or benzoyl peroxide.

29. A process for the direct oxidation of hydrogen to hydrogen peroxide which comprises subjecting in hydrogen to direct oxidation in the presence of a hydrophobic multicomponent catalyst comprising of a polymer membrane deposited on a Pd containing acidic catalyst and having general the formula:

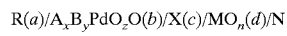

wherein:

R is a hydrophobic polymer, which forms a membrane permeable to hydrogen, oxygen and hydrogen peroxide vapors; A is selected from the group consisting of Ag, Au, Cu, Fe, Cd, Zn, Sn and mixtures thereof; B is selected from the group consisting of Ru, Pt, Rh, Ir, Os, and mixtures thereof; Pd is palladium; O is oxygen; X is selected from the group consisting of F, Cl, Br, I and mixtures thereof; M is selected from the group consisting of S, P, Mo, W, Ce, Sn, Th, and mixtures thereof, N is a catalytic porous solid, optionally supported on a catalyst carrier; x is A/Pd mole ratio in the range of 0 to about 1; y is a B/Pd mole ratio in the range of 0 to about 0.5; z is the number of oxygen atoms needed to fulfill the valence requirement of M; (d) is a weight percent loading of M deposited as $MO_n$ on the catalytic porous solid N, in the range of about 0.02 wt % to about 20 wt %; (c) is the weight percent loading of X deposited on $MO_n(d)/N$ in the range of about 0.02 wt % to about 20 wt %; (b) is the weight percent loading of $A_xB_yPd$ deposited as $A_xB_yPdO_z$ on $X(c)/MO_n(d)/N$ in the range of about 0.1 wt % to about 20 wt %; and (a) is a weight percent loading of the hydrophobic polymer R deposited on $A_xB_yPdO_z(b)/X(c)/MO_n(d)/N$ in the range of about 0.01 wt % to about 10 wt %.

* * * * *